United States Patent
Adams et al.

(10) Patent No.: US 11,084,474 B2
(45) Date of Patent: Aug. 10, 2021

(54) METHOD FOR CONTROLLING A SEPARATING CLUTCH

(71) Applicant: Voith Patent GmbH

(72) Inventors: Werner Adams, Crailsheim (DE);
Achim Menne, Crailsheim (DE);
Philipp Müller, Ellwangen (DE)

(73) Assignee: Voith Patent GmbH, Heidenheim (DE)

( * ) Notice: Subject to any disclaimer, the term of this patent is extended or adjusted under 35 U.S.C. 154(b) by 84 days.

(21) Appl. No.: 16/563,121

(22) Filed: Sep. 6, 2019

(65) Prior Publication Data

US 2020/0001844 A1      Jan. 2, 2020

Related U.S. Application Data

(63) Continuation of application No. PCT/EP2018/054324, filed on Feb. 22, 2018.

(30) Foreign Application Priority Data

Mar. 6, 2017 (DE) ................ 10 2017 104 600.3

(51) Int. Cl.
*B60T 10/02* (2006.01)
*F16D 48/06* (2006.01)
(Continued)

(52) U.S. Cl.
CPC .............. *B60T 10/02* (2013.01); *F16D 48/06* (2013.01); *F16D 57/02* (2013.01); *F16D 67/04* (2013.01);
(Continued)

(58) Field of Classification Search
CPC .. B60T 10/02; B60T 2201/04; B60T 2210/20; F16D 48/06; F16D 57/02;
(Continued)

(56) References Cited

U.S. PATENT DOCUMENTS

| | | | |
|---|---|---|---|
| 9,291,220 B2 | 3/2016 | Menne et al. | |
| 2014/0330495 A1* | 11/2014 | Menne | F16D 57/04 |
| | | | 701/68 |
| 2016/0082968 A1* | 3/2016 | Adams | F16D 57/02 |
| | | | 188/291 |

FOREIGN PATENT DOCUMENTS

| | | | | |
|---|---|---|---|---|
| DE | 10 2007 024 698 A1 | 11/2008 | | |
| DE | 10 2013 021 237 A1 | 7/2014 | | |
| WO | WO-2014062111 A1 * | 4/2014 | ............ | F16D 57/04 |

OTHER PUBLICATIONS

Notification of the Transmission of the International Search Report and Written Opinion of the International Search Authority or Declaration dated Jun. 4, 2018 for International Application No. PCT/EP2018/054324 (10 pages).

* cited by examiner

*Primary Examiner* — David R Morris
*Assistant Examiner* — Lori Wu
(74) *Attorney, Agent, or Firm* — Taylor IP, P.C.

(57) ABSTRACT

A method for controlling a separating clutch in a power train of a vehicle having a drive motor and a retarder. The clutch is arranged such that a rotor of the retarder is switched into a drive connection with the motor and/or power train via the clutch and a working chamber of the retarder can be filled with an operating medium to build up a braking power such that braking torque is exerted by the retarder onto the power train and/or motor. A control system switches the clutch into a closed or an open position. The switching of the clutch into the closed position occurs depending on an input signal to the controller, and the clutch is switched back into the open position depending on essentially no medium being present in the working chamber of the retarder and that predetermined limits of an operating and/or environmental parameter are not exceeded.

9 Claims, 1 Drawing Sheet

(51) Int. Cl.
*F16D 57/02* (2006.01)
*F16D 67/04* (2006.01)

(52) U.S. Cl.
CPC ....... *B60T 2201/04* (2013.01); *B60T 2210/20* (2013.01); *F16D 2500/10412* (2013.01); *F16D 2500/3067* (2013.01); *F16D 2500/30825* (2013.01); *F16D 2500/3124* (2013.01)

(58) Field of Classification Search
CPC ........... F16D 67/04; F16D 2500/10412; F16D 2500/3067; F16D 2500/30825; F16D 2500/3124
See application file for complete search history.

METHOD FOR CONTROLLING A SEPARATING CLUTCH

CROSS REFERENCE TO RELATED APPLICATIONS

This is a continuation of PCT application No. PCT/EP2018/054324, entitled "METHOD FOR CONTROLLING A SEPARATING CLUTCH", filed Feb. 22, 2018, which is incorporated herein by reference.

BACKGROUND OF THE INVENTION

1. Field of the Invention

The invention relates to a method for controlling a separating clutch in a power train of a motor vehicle, with a drive motor and a retarder.

2. Description of the Related Art

The assembly of a relevant power train is usually as follows: The separating clutch is arranged between the drive motor and/or the power train and retarder such that the rotor of the retarder can be switched into a drive connection with the drive motor and/or the power train via the separating clutch.

A method for controlling a retarder in a motor vehicle is disclosed in DE10 2007 024 698 A1. The described method concerns essentially the determination of the timing of engagement for the retarder clutch. By means of a precautionary coupling the retarder is switched into a retarder standby position, wherein the synchronization and coupling of the rotor with the power train occurs always when the driver of the motor vehicle switches the drive motor via a foot pedal, a lever or actuator from a first operating state into a second operating state. This shortens the overall activation time, because the retarder is already being precautionarily coupled even without a direct brake demand, so that in the event of an actual brake demand filling of the retarder can immediately begin.

SUMMARY OF THE INVENTION

It is one of the objectives of the present invention, to improve the method of controlling a separating clutch in such a manner that the coupling processes can be better coordinated with the motor vehicle operation, thus extending the life span of all of the components in the power train associated with braking.

As soon as the rotor is connected non-rotatably with the power train via the separating clutch, the working chamber of the retarder that is formed by the rotor and stator fills with an operating medium, so that a braking torque is exerted by the retarder onto the power train and/or the drive motor. Switching of the separating clutch occurs herein via a controller. The separating clutch can be switched into a closed position or an open position.

The separating clutch can comprise a synchronization unit to synchronize the rotor with the drive speed. It must moreover be ensured that the working chamber is only filled when a non-rotatable connection has been established by means of the separating device between the rotor and power train. In the event of a brake demand the clutch is closed and after the end of the brake demand is again opened. Prior to opening it must be ensured that the working chamber has been substantially emptied, whereby emptying is achieved in that the rotor continues to run for a certain time when the inlet into the working chamber is closed, thus pumping out the working chamber.

According to the invention, the objective of the present invention is met with a method according to the claims. Other advantageous arrangements and preferred solution variations are described in the dependent sub-claims.

According to the present invention a method is suggested for controlling a separating clutch in a power train in a motor vehicle having a drive motor and a retarder. The separating cutch is arranged between the drive motor and/or the power train and the retarder such that a rotor of the retarder can be switched into a drive connection with the drive motor and/or the power train via the separating clutch. A working chamber of the retarder can be filled with an operating medium in order to build up a braking power such that a braking torque is exerted by the retarder onto the power train and/or the drive motor when the working chamber between the rotor and the stator is filled with a working medium. Furthermore, a controller is provided by means of which the separating clutch can be switched into a closed position or an open position.

It is herein provided that the switching of the separating clutch into the closed position occurs depending on at least one input signal to the controller, and the separating clutch is switched back into the open position depending on essentially no working medium being present in the working chamber of the retarder and moreover, that predetermined limits of at least one additional operating and/or environmental parameter is not exceeded.

With this additional parameter it is ensured that the separating clutch only opens when it is determined during operation of the motor vehicle that engagement and disengagement of the clutch does not lead to a reduced service life of the associated components. Because of targeted non-disengagement, the retarder remains ready for operation without having to again be set up for operational readiness. This also increases the functional reliability.

Provision may be made that the input signal to the controller is generated by way of a foot pedal, a lever or an actuator.

Provision may further be made that switching of the separating clutch into the open position only occurs, if at least one of the following operational and/or environmental parameters is met and/or determinable limits are not exceeded:

Incline of the roadway time or distance until an inclined stretch of road is reached an appropriate input signal is generated by the driver the last retarder brake incidents were not generated within a defined time interval certain limits of the operating brakes of the vehicle were exceeded due to prior braking.

Provision may be made as an option or in addition, that an inclinometer and/or GPS data are used for determination of environmental parameters.

One design may provide that, when reaching an incline of >1.5% or a stretch of road of <300 m and/or a time of <10 s until reaching the inclined stretch of road, the retrieved environmental parameter has been passed through and the opening of the separating clutch is prevented. It is however also conceivable that a distance sensor and/or a proximity control is used for determining of environmental parameters.

Moreover, a temperature sensor can be used to measure the operating temperature of the operating brake.

It may be additionally provided that switching the clutch into the open position by way of a manually triggered signal is prevented. Thus, on recognition of an increased braking probability the driver can prevent decoupling of the retarder. This can occur by means of a relevant signal, such as activation of a switch.

Moreover, switching of the clutch into the open position can be prevented in the event that a drive motor and/or a power train speed and/or rotor shaft speed is exceeded.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
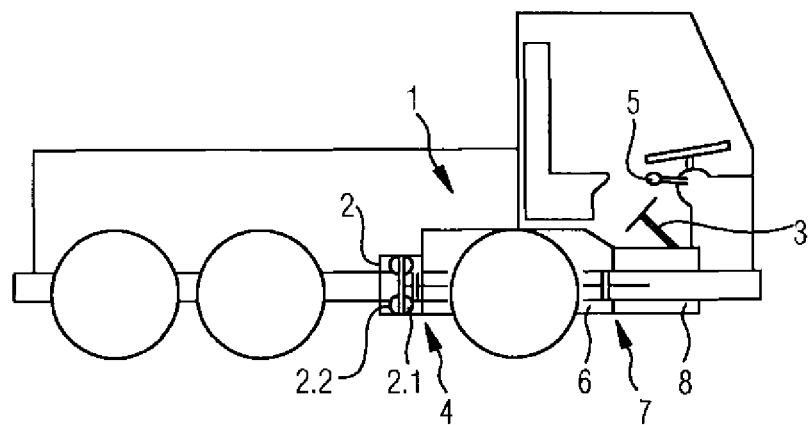
FIG. 1 is a schematic illustration of a motor vehicle for use with an embodiment of a method according to the present invention.

FIG. 1 illustrates a power train 1 of a vehicle including a drive motor 8, a transmission 6 and a hydrodynamic brake 2 or a retarder 2 arranged on the output side of transmission 6. Retarder 2 is connected via a booster, which is not illustrated herein, with transmission 6. The retarder 2 is therefore a so-called secondary retarder 2.

The output of drive motor 8 is controllable by a foot pedal 3. The more foot pedal 3 is pressed down, the higher is the output of drive motor 8 via clutch 7 to transmission 6.

Retarder 2 is switchable into a drive connection with transmission 6 via a separating clutch 4. Thus, an indirect coupling occurs into vehicle power train 1. Retarder 2 is switchable into a direct drive connection with power train 1 and can be disengaged from this drive connection in that separating clutch 4 is closed or opened. When separating clutch 4 is closed, rotor 2.1 of retarder 2 is accelerated via a transmission output shaft, for example a booster.

In a filled state, a circulatory disturbance occurs, so that a torque is transferred by the working medium in the working chamber from rotor 2.1 to stator 2.2, which in turn causes a braking effect or braking torque upon rotor 2.1. According to the present invention, rotor 2.1 of retarder 2 is driven by closing of separating clutch 4 even under certain constraints in an empty state of brake 2, or respectively in a largely empty state of brake 2, in order to move retarder 2, so to speak, into a standby operation.

Braking performance of retarder 2 is adjustable by way of a brake actuator 5, which is operable by the driver, meaning it is adjustable in a closed control system or controllable in an open control system. Alternatively or in addition, a control device, for example a cruise control system or a proximity control, may be provided which controls the braking power depending on certain operational conditions or predefined specifications.

Alternatively to the illustrated arrangement, retarder 2 may also be designed as a primary retarder meaning that, viewed in direction of the drive connection of drive motor 8 to the drive wheels, it is located before transmission 6 or the transmission input and is driven with motor speed.

Figure 2:
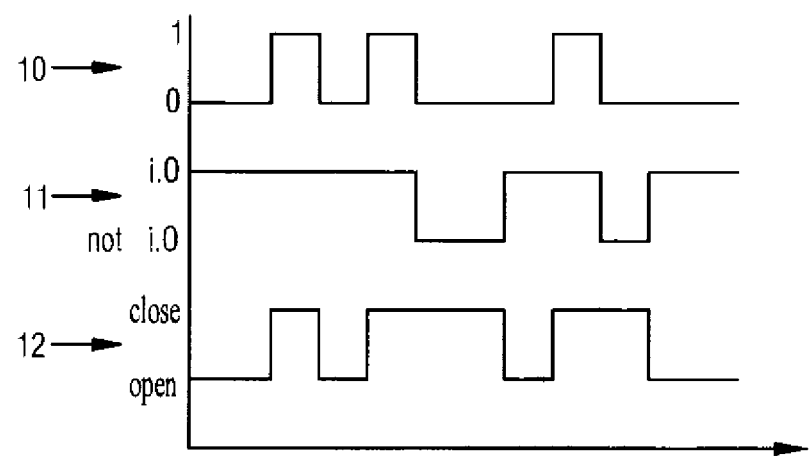
FIG. 2 is a flow chart providing an exemplary illustration of a process sequence of the method according to the invention.

FIG. 2 illustrates a flow chart showing an exemplary process sequence of the inventive method. Separating clutch 4 is always being closed if an input signal 10 is issued. An input signal may be the positioning of foot pedal 3, or a gas pedal. A signal for closing of the clutch is generated when the driver releases the foot pedal, in other words, when the pressure on foot pedal 3 is terminated. An input signal may however also come from lever switch 5 of the retarder that is operated by the driver, or the input signal comes from an actuator.

Switching of the separating clutch back into the open position only occurs depending on essentially no working medium, or substantially no working medium, being present in the working chamber of retarder 2 and moreover, that predetermined limits of at least one additional operating and/or environmental parameters 11 are not exceeded. It is thus not sufficient that the driver presses foot pedal 3 again in order to switch the clutch into the open position. Instead an additional parameter is requested via the control system which will ultimately decide the opening of the clutch.

Switching of separating clutch 4 into the open position occurs only when at least one of the following operating and/or environmental parameters 11 is met and/or definable threshold values are not exceeded. If, for example, a slope in the roadway is determined, then the clutch remains closed. Moreover, the time to reach a sloping road section can be used as a criterion. A relevant input signal 10 can also be issued alternatively or in addition by the driver.

Technical conditions can however also require that it is useful or necessary to keep separating clutch 4 more effectively closed. For example, if the last retarder braking actions were generated within a defined time interval. Thus, opening occurs only if in a prior time interval not too many braking actions or switching into the closed position occurred.

Furthermore, measured values from all sensors in the power train can be used for this purpose. If certain threshold values of operating parameters of the vehicle are exceeded, due to previous braking actions, the separating clutch does not open.

If the parameter state is in order "i.o."—meaning that no threshold value is exceeded and all parameters are adhered to, the separating cutch can be switched into the open or closed position, depending on signal status 0 or 1. In the sense of the current invention the parameter state, is a state determined by the controller, which can consist of one or several operating parameters, measured values and/or environmental parameters. The sum total of all values and/or individual assessments either leads to an "i.o." (in order) status or a "not i.o." (not in order) status. The separating clutch will not open if a "not i.o." (not in order) is indicated.

If the threshold values or operating parameters are exceeded, then no switching (see signal 12) of the separating clutch occurs from the "closed position" to the "open position", even if no input signal is present. The separating clutch will be opened only when the operating parameters are again "i.o." (in order).

It is not illustrated which conditions have to be met so that the separating clutch switches from the open to the closed position. We refer to DE 10 2007 024 698 A1 which already specifies in detail a possible method for control of a hydrodynamic brake with which sufficiently short reaction times of the retarder are achieved in order to switch same to operational readiness.

By anticipatory switching of the separating clutch, in other words precautionary closing of the separating clutch as described in DE10 2007 024 698 A1, as well as precautionarily keeping the separating clutch closed or rather not opening it is achieved that in non-braking operation the no-load losses are minimized and that the separating clutch can be designed to be compact and durable.

The input signal to the controller is generated by way of a foot pedal, a lever or an actuator.

Provision may further be made that switching of the separating clutch into the open position only occurs, if at least one of the following operational and/or environmental parameters is met and/or determinable limits are not exceeded:

Incline of the roadway
time or distance until an inclined stretch of road is reached
an appropriate input signal 10 is generated by the driver
the last retarder brake incidents were not generated within a defined time interval
certain limits of the operating brakes of the vehicle were exceeded due to prior braking.

Provision may be made as an option or in addition, that an inclinometer and/or GPS data are used for determination of environmental parameters.

One design may provide that, when reaching an incline of >1.5% or a stretch of road of <300 m and/or a time of <10 s until reaching the inclined stretch of road, the retrieved environmental parameter has been passed through and opening of the separating clutch is prevented. It is however also conceivable that a distance sensor and/or a proximity control is used for determining of environmental parameters.

Moreover, a temperature sensor can be used to measure the operating temperature of the operating brake.

It may be additionally provided that switching the clutch into the open position by means of a manually triggered signal is prevented. Thus, on recognition of an increased braking probability the driver can prevent decoupling of the retarder. This can occur by means of a relevant signal, such as activation of a switch.

Moreover, switching of the clutch into the open position can be prevented in the event that a drive motor and/or a power train speed and/or rotor shaft speed is exceeded.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST

1 Drive train
2 Retarder
3 Foot pedal
4 Separating clutch
5 Brake actuator
6 Transmission
7 Clutch
8 Motor
9 Wheels
10 Input signal
11 Parameter state
12 Clutch position

What is claimed is:

1. A method for controlling a separating clutch in a power transmission of a motor vehicle, comprising the steps of:
    arranging a separating cutch between a drive motor and/or a power transmission and a retarder such that a rotor of the retarder can be switched into a drive connection with the drive motor and/or the power transmission by the separating clutch;
    filling of a working chamber of the retarder with an operating medium in order to build up a braking power such that a braking torque is exerted by the retarder onto the power transmission and/or the drive motor;
    switching the separating clutch into a closed position or an open position under a control of a control system, the switching of the separating clutch into the closed position occurs depending on at least one input signal to the controller, and the separating clutch is switched back into the open position depending on essentially no working medium being present in the working chamber of the retarder and that predetermined limits of at least one additional operating and/or environmental parameter are not exceeded.

2. The method of claim 1, wherein the input signal to the controller is generated by way of a foot pedal, a lever or an actuator.

3. The method of claim 1, wherein the switching of the separating clutch into the open position only occurs when at least one of the following operational and/or environmental parameters is met and/or the predetermined limits are not exceeded:
    incline of a roadway
    time or distance until an inclined stretch of a road is reached
    an input signal is generated by the driver
    last retarder brake incidents or switching into the closed position were not generated within a defined time interval and
    predetermined limits of operating brakes of the vehicle were exceeded due to prior braking.

4. The method of claim 3, wherein an inclinometer and/or GPS data are used for determination of the environmental parameters.

5. The method of claim 3, wherein the incline of the roadway is >1.5% or a stretch of the road of <300 m and/or a time of <10 s until reaching the inclined stretch of road is calculated.

6. The method of claim 3, wherein a distance sensor and/or a proximity control are used for determining of the environmental parameters.

7. The method of claim 3, further comprising the step of measuring an operating temperature of the operating brakes with a temperature sensor.

8. The method of claim 1, further comprising the step of preventing the switching of the clutch into the open position by means of a manually triggered signal.

9. The method of claim 1, further comprising the step of preventing the switching of the clutch into the open position when a drive motor speed and/or a power transmission speed and/or a rotor shaft speed is exceeded.

* * * * *